US012577093B2

(12) United States Patent
Beam, IV

(10) Patent No.: US 12,577,093 B2
(45) Date of Patent: Mar. 17, 2026

(54) ELECTRICALLY INSULATED MOUNTING PLATFORM AND ASSOCIATED AERIAL SYSTEMS

(71) Applicant: STECO BARRIERS LLC, Shelby, NC (US)

(72) Inventor: Dennis Beam, IV, Shelby, NC (US)

(73) Assignee: STECO BARRIERS LLC, Shelby, NC (US)

( * ) Notice: Subject to any disclaimer, the term of this patent is extended or adjusted under 35 U.S.C. 154(b) by 596 days.

(21) Appl. No.: 18/076,655

(22) Filed: Dec. 7, 2022

(65) Prior Publication Data

US 2024/0190687 A1 Jun. 13, 2024

(51) Int. Cl.
*B66F 17/00* (2006.01)
*B66F 11/04* (2006.01)

(52) U.S. Cl.
CPC .......... *B66F 17/006* (2013.01); *B66F 11/044* (2013.01)

(58) Field of Classification Search
None
See application file for complete search history.

(56) References Cited

U.S. PATENT DOCUMENTS 1,638,611 A * 8/1927 Baldwin ................. B66F 11/04 105/238.1
2,352,565 A * 6/1944 Ranson ................. E04H 12/187 403/102
2,554,288 A * 5/1951 Frederick ................ E04H 12/08 52/298
2,647,022 A * 7/1953 Smid ....................... B66F 11/04 52/114
2,666,417 A * 1/1954 Harsch .................... F15B 15/16 52/114
3,191,716 A * 6/1965 Eitel ...................... B66F 11/046 182/2.4
3,320,524 A * 5/1967 Miller, Jr. ............ G01R 27/025 340/657
3,958,377 A * 5/1976 Milner, Jr. ............ B66F 11/044 52/118
4,185,427 A * 1/1980 Raymond ............. B66F 11/044 52/115
4,534,444 A * 8/1985 Smith ................... B66F 11/046 182/2.11
4,589,520 A * 5/1986 Tapfer ..................... B66F 11/04 182/69.4
4,676,340 A * 6/1987 Correll, Jr. ............ B66F 11/046 182/2.11
4,679,653 A * 7/1987 Pasquarette, Jr. ..... B66F 11/046 182/2.4

(Continued)

OTHER PUBLICATIONS

"Electrically Insulated Man Lifts," Bailey, Specialty Cranes and Aerials, Available Online at: https://baileycranes.com/manlifts/electrically-insulated-lifts.html, Accessed from Internet on Feb. 27, 2023, 4 pages.

*Primary Examiner* — Robert Canfield
(74) *Attorney, Agent, or Firm* — Kilpatrick Townsend & Stockton LLP

(57) ABSTRACT

An aerial system for equipment such as but not limited to a crane, derrick, bucket truck, man lift, and the like, includes a mounting platform for mounting an aerial device on a ground-engaging chassis. The mounting platform is an electrical insulator. In use, a vertical height or position of the mounting platform may be fixed.

20 Claims, 3 Drawing Sheets

(56) References Cited

U.S. PATENT DOCUMENTS

| | | | | | |
|---|---|---|---|---|---|
| 4,946,003 | A * | 8/1990 | Walbridge | B66F 11/046 | 182/2.11 |
| 6,810,993 | B2 * | 11/2004 | Promersberger | B66F 11/044 | 182/63.1 |
| 8,857,567 | B1 * | 10/2014 | Raymond | B66C 23/702 | 182/2.1 |
| 9,550,475 | B1 * | 1/2017 | Walker | B66C 23/78 | |
| 10,124,773 | B1 * | 11/2018 | Mourlam | B60S 9/12 | |
| 11,016,127 | B2 * | 5/2021 | Ball | G01R 31/1245 | |
| 12,378,102 | B2 * | 8/2025 | Archer | B66F 11/04 | |
| 2003/0172598 | A1 * | 9/2003 | Greer | B66F 11/044 | 52/116 |
| 2006/0175127 | A1 * | 8/2006 | Higgins | B66F 11/044 | 182/2.1 |
| 2013/0048425 | A1 * | 2/2013 | Thompson | B66C 23/701 | 427/160 |
| 2013/0313351 | A1 * | 11/2013 | Beam, III | A01G 3/002 | 241/101.74 |
| 2017/0174488 | A1 * | 6/2017 | Sheeley | B66F 11/046 | |
| 2019/0071020 | A1 * | 3/2019 | Beam, IV | B66C 23/36 | |
| 2019/0112172 | A1 * | 4/2019 | Wabnegger | F26B 3/04 | |
| 2019/0135603 | A1 * | 5/2019 | Bilic | H02G 1/02 | |
| 2020/0039805 | A1 * | 2/2020 | Li | B66F 11/046 | |
| 2024/0001834 | A1 * | 1/2024 | Polonski | B62D 33/02 | |
| 2024/0190687 | A1 * | 6/2024 | Beam, IV | B66F 11/046 | |

* cited by examiner

ELECTRICALLY INSULATED MOUNTING PLATFORM AND ASSOCIATED AERIAL SYSTEMS

FIELD OF THE INVENTION

The invention relates to equipment with aerial devices, and more particularly to equipment with aerial devices that work near energized conductors.

BACKGROUND OF THE INVENTION

Various industries such as the arboricultural, construction, agriculture, manufacturing, and other industries use equipment with aerial devices to provide temporary access to people or equipment to otherwise inaccessible areas high above the ground. As non-limiting examples, equipment such as cranes, derricks, bucket trucks, man lifts, etc. may include aerial devices. Aerial devices commonly include a work device for workers to stand on and an elevating system, such as a boom, for vertically raising and lowering the work device. Aerial devices may be unpowered, self-propelled, or vehicle mounted.

While working at an elevated height, aerial devices have the potential to contact various structures or devices, some of which may present a significant safety issue. As an example, at an elevated height, aerial devices may potentially contact energized conductors such as but not limited to energized electrical lines. In such cases, contact between the aerial device and the energized conductors may in turn may energize the equipment (e.g., cab, chassis, frame, etc.), which presents a significant risk of electrocution to any personnel. While standards exist for maintaining a minimum approach distance (MAD) from energized electrical lines, such contact between aerial devices and energized conductors is still possible due to operator error, equipment error, or both.

SUMMARY

The terms “invention,” “the invention,” “this invention” and “the present invention” used in this patent are intended to refer broadly to all the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, an aerial system includes an aerial device with a work device and an elevating system for selectively raising and lowering the work device. The aerial system also includes a mounting platform coupled to the elevating system and including an interface for engaging a chassis of the aerial system such that the mounting platform mounts the aerial device to the chassis. The mounting platform is an electrical insulator.

According to various embodiments of the present invention, an aerial system includes a ground-engaging chassis for supporting an aerial device with a work device and an elevating system. The aerial system also includes a mounting platform on the chassis. The mounting platform forms an interface for engaging the elevating system of the aerial device. In various embodiments, the mounting platform is an electrical insulator.

According to some embodiments of the present invention, an aerial system includes a mounting platform for mounting an aerial device on a ground-engaging chassis. In certain embodiments, a vertical height of the mounting platform is fixed. In various embodiments, the mounting platform is an electrical insulator.

Various implementations described in the present disclosure can include additional systems, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

Disclosed herein are aerial systems with an electrically insulating mounting platform. The mounting platforms described herein electrically isolate and/or insulate a ground-engaging portion of the aerial system from an aerial device of the aerial system that may be selectively elevated and lowered during use. The mounting platforms described herein may be constructed from various electrically insulating materials as desired, such as but not limited to dielectric materials, non-conductive materials, and/or non-metallic materials. In certain embodiments, the mounting platform may substantially maintain a vertical height regardless of a position of the aerial device. In various embodiments, the mounting platform connects and/or forms the interface between the aerial device and the ground-engaging portion such that the aerial device is mounted on the ground-engaging portion via the mounting platform. Compared to traditional approaches, aerial systems with the electrically insulating mounting platforms described herein may provide increased safety by reducing the possibility of electric shock and/or electrocution to personnel on the ground when the aerial device contacts an energized conductor. The systems described herein may additionally reduce potential damage to ground-engaging portions of the aerial system due to becoming energized. As examples, by mounting the elevating portion to the ground engaging portion and/or by substantially maintaining a vertical height, the mounting platforms described herein electrically insulate and/or isolate the ground-engaging portion of the aerial system regardless of a portion of the aerial device that comes into contact with energized conductors such as suspended electrical lines.

The mounting platforms described herein may be provided natively with an aerial system and/or as a retrofit. As a retrofit, the mounting platforms described herein may allow for continued use of an existing elevating system (e.g., the existing boom), thereby providing cost savings to operators of aerial systems. The mounting platforms described herein may allow improved operation of aerial systems. As non-limiting examples, while operators still desire to avoid contact with conductors, operators need not necessarily track portions of the aerial device relative to the energized conductors.

Various other advantages and benefits may be realized with the systems and methods described herein, and the aforementioned benefits should not be considered limiting.

Figure 1:
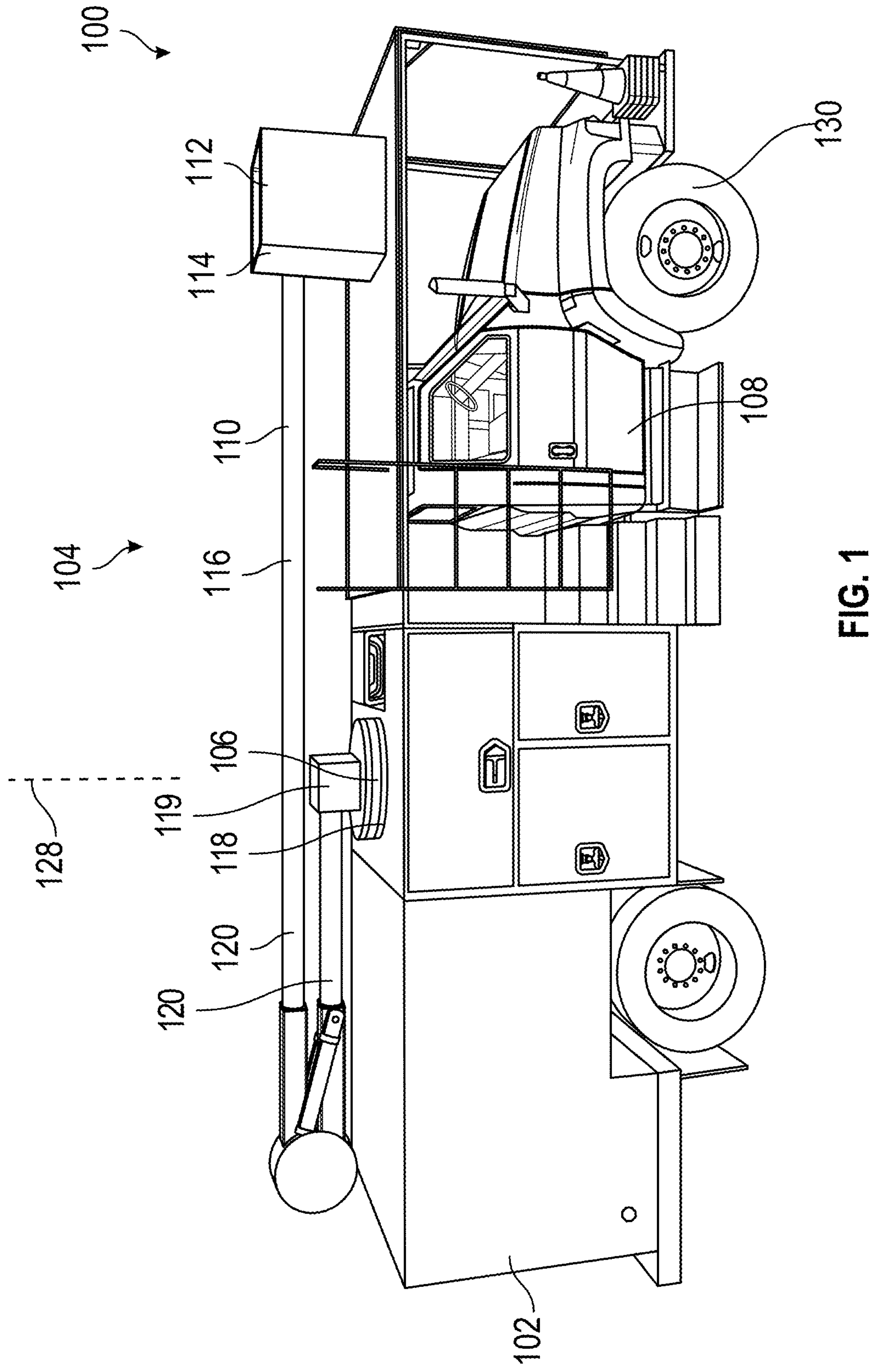
FIG. 1 illustrates an aerial system with a mounting platform according to embodiments.
Figure 2:
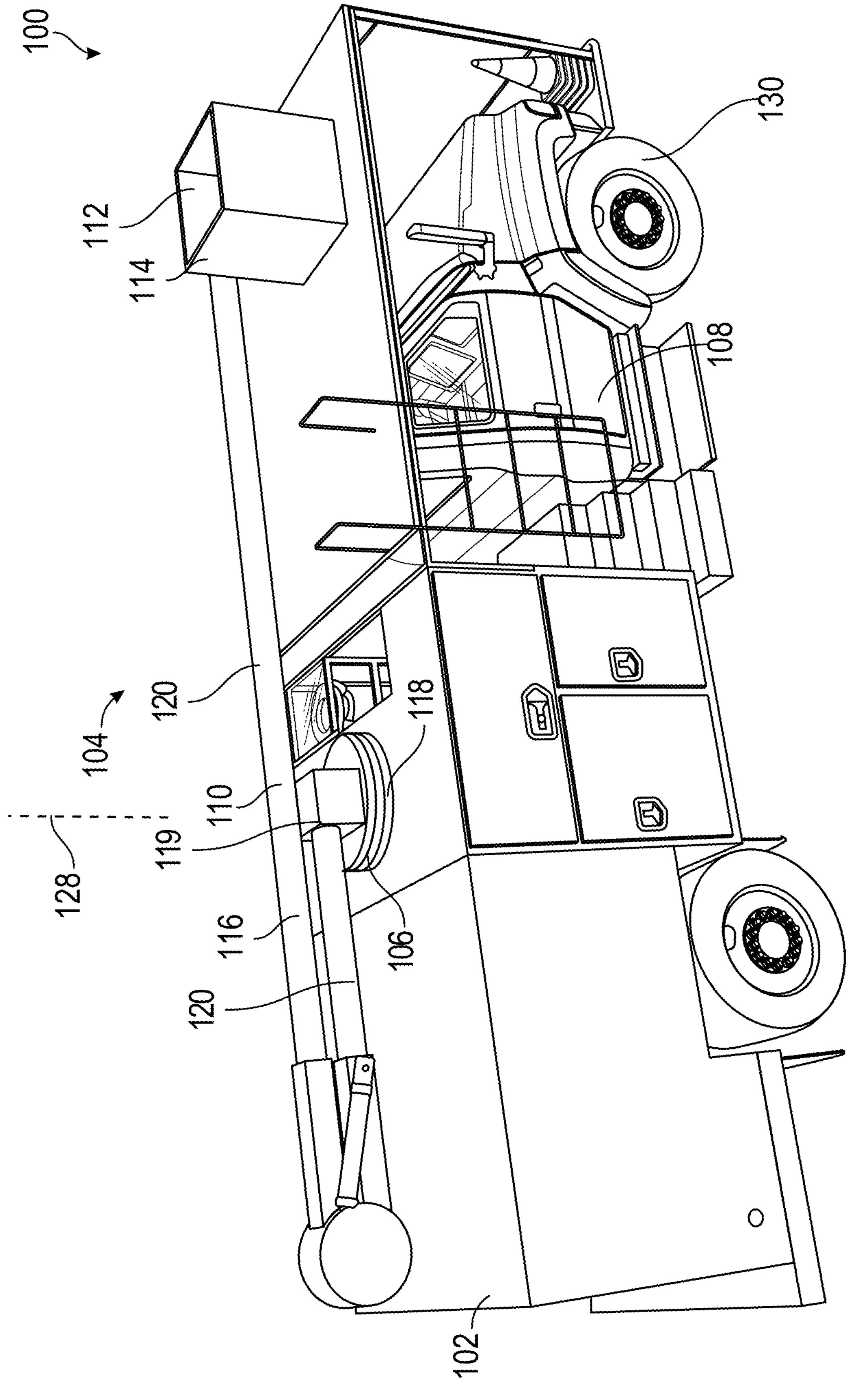
FIG. 2 is another view of the aerial system of FIG. 1.

FIGS. 1 and 2 illustrate an example of an aerial system 100 according to embodiments. The aerial system 100 generally includes a ground-engaging chassis or portion 102, an aerial device 104, and a mounting platform 106. As discussed in detail below, the mounting platform 106 is an electrically insulating material that connects the aerial device 104 to the ground-engaging portion 102.

In the embodiment illustrated, the ground-engaging portion 102 is a vehicle 108 and such that the aerial device 104 is a vehicle-mounted aerial device. In the embodiment illustrated, the vehicle 108 includes motive elements 130 (e.g., wheels, tracks, etc.) such that the aerial system 100 is movable along a surface such as the ground. The specific vehicle 108 and/or arrangement of the aerial device 104 on the vehicle 108 illustrated should not be considered limiting on the disclosure, as in other embodiments, the vehicle 108 may be other types of vehicles as desired and/or the aerial device 104 may be mounted in other configurations such as a mid-mounted aerial device, a rear-mounted aerial device, etc. Moreover, while a vehicle 108 is illustrated as the ground-engaging portion 102, in other embodiments, the ground-engaging portion 102 may be other ground-engaging structures, frames, etc. as desired, such as but not limited to structures or frames with powered or unpowered motive elements (e.g., wheels, tracks, rollers, etc.), structures or frames without motive elements, etc. As non-limiting examples, the ground-engaging portion 102 may be a ground-engaging portion of a crane, a derrick, a man lift, and/or other equipment as desired. Optionally, at least a portion of the ground-engaging portion 102 is constructed from a metallic material and/or an electrically conductive material.

The aerial device 104 may be a manned aerial device (meaning it is configured to accommodate one or more workers during use) or an unmanned aerial device (meaning that a worker is not necessarily on the aerial device during use). The aerial device 104 generally includes an elevating system 110 and a work device 112. Optionally, at least a portion of the aerial device 104 (e.g., a portion of the elevating system 110 and/or a portion of the work device 112) is constructed from a metallic material and/or an electrically conductive material.

In embodiments wherein the aerial device 104 is a manned aerial device, the work device 112 may be at least a work platform, bucket, and/or other suitable device or structure for accommodating the worker(s). Other equipment or devices such as but not limited to saws, hoses, tools, etc. depending on the intended environment and use of the aerial device 104 optionally are provided when the work device 112 accommodates the worker(s). In embodiments where the aerial device 104 is unmanned, the work device 112 may be various equipment or devices as desired, such as but not limited to saws, trimming devices, cranes, hoses, tools, etc. depending on the intended environment and use of the aerial device 104. In the example of FIGS. 1 and 2, the work device 112 is a work platform or bucket 114 that accommodates at least one worker.

The elevating system 110 is various suitable devices, mechanisms or systems at least selectively vertically positioning the work device 112. As non-limiting examples, the elevating system 110 may be a boom, vertical lift, hotel lift mechanism, scissor lift, etc. A base 119 of the elevating system 110 may be connected to the mounting platform 106 as illustrated in FIGS. 1 and 2. In the embodiment of FIGS. 1 and 2, the elevating system 110 is a boom 116 with one or more sections 120. Vertically positioning the work device 112 may allow for a worker, workers, and/or equipment on the work device 112 to access areas at an elevated height. In certain embodiments, the elevating system 110 is movable between a stowed or lowered configuration (as illustrated in FIGS. 1 and 2) and an elevated configuration. In the elevated configuration, the work device 112 is provided at a vertical height that is greater than the height of the work device 112 when the elevating system 110 is in the lowered configuration. In various embodiments, the elevating system 110 may perform an additional movement operation in additional to vertically positioning the work device 112. As non-limiting examples, the elevating system 110 may rotate about an axis, horizontally position the work device 112, move while changing angles of attack, etc. In the example of FIGS. 1 and 2, in addition to vertically positioning the work device 112, the elevating system 110 rotates about an axis 128 defined by a pedestal 118 of the ground-engaging portion 102.

The mounting platform 106 of the aerial system 100 connects the aerial device 104 to the ground-engaging portion 102. In various embodiments, the mounting platform 106 is an electrical insulator such that the mounting platform 106 electrically insulates and/or isolates the ground-engaging portion 102 from the aerial device 104. The mounting platform 106 may be constructed from various electrically insulating materials as desired such a dielectric material and/or non-metallic materials. As non-limiting examples, the mounting platform 106 may be a glass-based material, a porcelain-based material, a composite polymer material, combinations thereof, and/or other suitable electrically insulating materials as desired. The mounting platform 106 may have various shapes, profiles, and/or configurations as desired suitable for connecting the aerial device 104 to the ground-engaging portion 102, and the shape, profile, and configuration illustrated in FIGS. 1 and 2 should not be considered limiting.

In some embodiments and as illustrated in FIGS. 1 and 2, the mounting platform 106 may connect the elevating system 110 to the ground-engaging portion 102. In various embodiments, the mounting platform 106 includes an interface for engaging the ground-engaging portion 102 and an interface for engaging the aerial device 104. The interfaces may be various suitable devices and/or mechanisms for engaging and connecting the mounting platform 106 with the aerial device 104 and/or the ground-engaging portion, such as but not limited to various mating structures, mechanical fasteners, and/or other connectors, structures, or mechanisms as desired.

In various embodiments, the mounting platform 106 may be provided at a substantially fixed or predetermined vertical height on the ground-engaging portion 102. In some embodiments, the mounting platform 106 optionally may be fixed on the ground-engaging portion 102. As a non-limiting example and as illustrated in FIGS. 1 and 2, the mounting platform 106 may be provided at a fixed location on the ground-engaging portion 102, such as but not limited to the pedestal 118 or other structure. In other embodiments, the mounting platform 106 need not be mounted on the pedestal 118 and may be provided at other locations on the ground-engaging portion 102 as desired. In other embodiments, the mounting platform 106 may be movable along the ground-engaging portion 102 while substantially maintaining its vertical height.

In certain embodiments, the aerial device 104 is movable relative to the mounting platform 106 while being connected to the mounting platform 106. In such embodiments, hinge mechanisms, joint mechanisms, bearings, and/or other devices or systems may connect the aerial device 104 to the mounting platform 106 such that the aerial device 104 is movable relative to the mounting platform 106. In various embodiments, the mounting platform 106 substantially maintains its vertical height on the ground-engaging portion 102 while the aerial device 104 moves relative to the mounting platform 106 (e.g., while the vertical height of the work device 112 changes and/or the configuration of the elevating system 110 changes).

Figure 3:
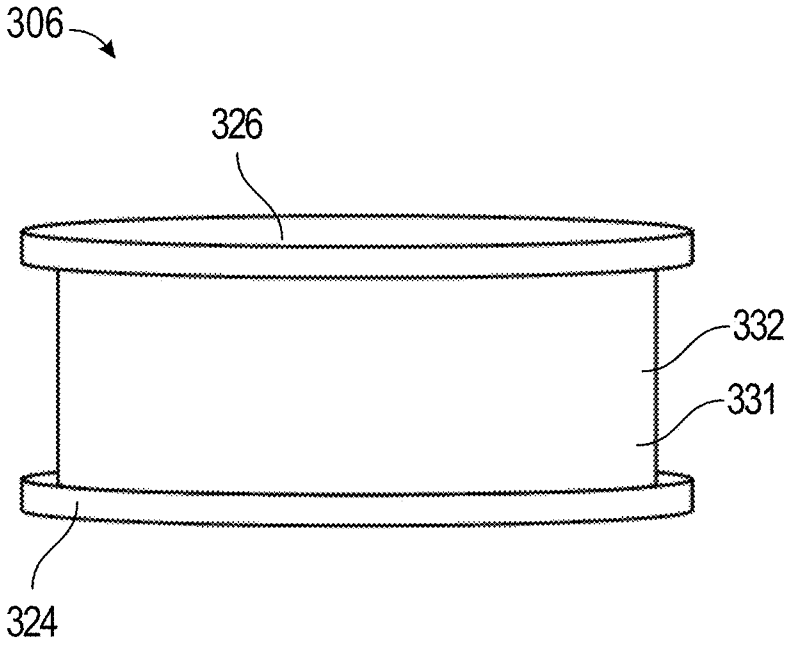
FIG. 3 illustrates a portion of an aerial system with a mounting platform according to embodiments.

FIG. 3 illustrates a non-limiting example of another mounting platform 306 for an aerial system that is substantially similar to the mounting platform 106 except that it has a different profile. As illustrated in FIG. 3, the mounting platform 306 includes an electrically insulating material 332 as a core 331 and with an interface 324 for engaging a ground-engaging portion of the aerial system and an interface 326 for engaging an aerial device of the aerial system and such that the aerial device is connected to the ground-engaging portion via the mounting platform 306. In some embodiments, the interface 324 and/or the interface 326 may be monolithic and/or integral with the electrically insulating material 332. In such embodiments, the interfaces 324, 426 may be electrically insulating material. In other embodiments, the interface 324 and/or the interface 326 may be separate devices or components attached to the electrically insulating material 332. In such embodiments, the interfaces 324, 326 may be electrically insulating material, although they need not be.

The electrically insulating mounting platforms 106, 306 at the substantially fixed vertical height and/or connecting the aerial device 104 to the ground-engaging portion 102 provides improved protection to personnel on the ground and/or the equipment of the ground-engaging portion 102 compared to traditional approaches. As a non-limiting example, the electrically insulating mounting platforms 106, 306 may insulate and/or isolate personnel on the ground and/or the ground-engaging portion 102 regardless of the position of the aerial device 104. As such, personnel on the ground and/or equipment of the ground-engaging portion 102 may have improved protection regardless of the portion of the aerial device (e.g., lower boom section 120, upper boom section 120, and/or the work device 112) that contacts an elevated power line or other energized conductor during use. In certain embodiments, the fixed vertical height of the mounting platform 106 may be a known and/or determined height at which energized conductors are not commonly encountered in normal operating conditions of the aerial system 100, thereby improving operations of the aerial system 100 (e.g., because personnel need not necessarily track a particular vertical height or location of the aerial device 104).

As an interface between the aerial device 104 and the ground-engaging portion 102, the mounting platforms 106 may be provided natively with the aerial system 100 and/or may be implemented as a retrofit to improve the safety of existing aerial systems. A non-limiting example of a method of retrofitting an aerial system with a mounting platform described herein may include disassembling the existing aerial device 104 from the existing ground-engaging portion 102, attaching and/or connecting the mounting platform 106 to the existing ground-engaging portion 102, and attaching and/or connecting the existing aerial device 104 to the mounting platform 106 such that the mounting platform 106 now connects the existing aerial device 104 to the existing ground-engaging portion 102.

As mentioned, various other advantages and benefits may be realized with the systems and methods described herein, and the aforementioned benefits should not be considered limiting.

A collection of exemplary embodiments is provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. An aerial system comprising: an aerial device comprising a work device and an elevating system configured to raise and lower the work device; and a mounting platform coupled to the elevating system and comprising an interface configured to engage a chassis of the aerial system such that the mounting platform mounts the aerial device to the chassis, wherein the mounting platform is an electrical insulator.

Illustration 2. The aerial system of any preceding or subsequent illustrations or combination of illustrations, wherein the mounting platform comprises a dielectric material.

Illustration 3. The aerial system of any preceding or subsequent illustrations or combination of illustrations, wherein the elevating system is movable relative to the mounting platform.

Illustration 4. The aerial system of any preceding or subsequent illustrations or combination of illustrations, wherein the mounting platform comprises a non-metallic material.

Illustration 5. The aerial system of any preceding or subsequent illustrations or combination of illustrations, further comprising the chassis, wherein the chassis is a ground-engaging chassis, and wherein the mounting platform is fixed on the chassis.

Illustration 6. The aerial system of any preceding or subsequent illustrations or combination of illustrations, wherein the elevating system comprises a boom, and wherein the boom is at least vertically movable between a lowered position and an elevated position.

Illustration 7. The aerial system of any preceding or subsequent illustrations or combination of illustrations, wherein a vertical height of the mounting platform is fixed.

Illustration 8. An aerial system comprising: a ground-engaging chassis configured to support an aerial device comprising a work device and an elevating system; and a mounting platform on the chassis and forming an interface configured to engage the elevating system of the aerial device, wherein the mounting platform is an electrical insulator.

Illustration 9. The aerial system of any preceding or subsequent illustrations or combination of illustrations, wherein the mounting platform comprises a dielectric material.

Illustration 10. The aerial system of any preceding or subsequent illustrations or combination of illustrations, wherein the ground-engaging chassis comprises a vehicle chassis.

Illustration 11. The aerial system of any preceding or subsequent illustrations or combination of illustrations, further comprising the aerial device, wherein the aerial device comprises a work device and a boom for positioning the work device relative to the vehicle chassis, and wherein the mounting platform connects the boom to the vehicle chassis.

Illustration 12. The aerial system of any preceding or subsequent illustrations or combination of illustrations, a vertical height of the mounting platform is fixed.

Illustration 13. The aerial system of any preceding or subsequent illustrations or combination of illustrations, further comprising the aerial device, wherein the aerial device comprises a work device and an elevating system, wherein the mounting platform is fixed relative to the chassis, wherein the mounting platform connects the elevating system to the chassis, and wherein the elevating system is movable relative to the mounting platform.

Illustration 14. The aerial system of any preceding or subsequent illustrations or combination of illustrations, wherein the elevating system is configured to perform at least two movement operations relative to the mounting platform.

Illustration 15. An aerial system comprising a mounting platform configured to mount an aerial device on a ground-engaging chassis, wherein a vertical height of the mounting platform is fixed, and wherein the mounting platform is an electrical insulator.

Illustration 16. The aerial system of any preceding or subsequent illustrations or combination of illustrations, wherein the mounting platform comprises a dielectric material.

Illustration 17. The aerial system of any preceding or subsequent illustrations or combination of illustrations, wherein the mounting platform comprises a non-metal material.

Illustration 18. The aerial system of any preceding or subsequent illustrations or combination of illustrations, further comprising the ground-engaging chassis and the aerial device, wherein the aerial device is at least vertically movable relative to the ground-engaging chassis and relative to the mounting platform.

Illustration 19. The aerial system of any preceding or subsequent illustrations or combination of illustrations, wherein the mounting platform comprises a glass-based material, a porcelain-based material, or a composite polymer material.

Illustration 20. The aerial system of any preceding or subsequent illustrations or combination of illustrations, further comprising: the ground-engaging chassis, wherein the ground-engaging chassis is a vehicle chassis, and wherein the vehicle chassis comprises motive elements; and the aerial device, wherein the aerial device comprises a work device and a boom, wherein the boom is movable relative to the vehicle chassis, wherein the mounting platform connects the boom to the vehicle chassis, and wherein a vertical height of the mounting platform is fixed.

The various aspects, embodiments, implementations or features of the described embodiments can be used separately or in any combination. It should be appreciated that the various elements of concepts from the figures may be combined without departing from the spirit or scope of the invention.

The use of the terms "a" and "an" and "the" and similar referents in the context of describing the invention (especially in the context of the following claims) are to be construed to cover both the singular and the plural, unless otherwise indicated herein or clearly contradicted by context. Directional references such as "up," "down," "top," "bottom," "left," "right," "front," and "back," among others, are intended to refer to the orientation as illustrated and described in the figure (or figures) to which the components and directions are referencing. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, or gradients thereof, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, the nearness of completion will be so as to have the same overall result as if absolute and total completion were obtained.

Preferred embodiments of this invention are described herein, including the best mode known to the inventors for carrying out the invention. The invention is susceptible to various modifications and alternative constructions, and certain shown exemplary embodiments thereof are shown in the drawings and have been described above in detail. Variations of those preferred embodiments, within the spirit of the present invention, may become apparent to those of ordinary skill in the art upon reading the foregoing description. The inventors expect skilled artisans to employ such variations as appropriate, and the inventors intend for the invention to be practiced otherwise than as specifically described herein. Accordingly, it should be understood that there is no intention to limit the invention to the specific form or forms disclosed, but on the contrary, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The foregoing description, for purposes of explanation, used specific nomenclature to provide a thorough understanding of the described embodiments. However, it will be apparent to one skilled in the art that the specific details are not required in order to practice the described embodiments.

Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

That which is claimed is:

1. An aerial system comprising:

an aerial device comprising a work device and an elevating system configured to raise and lower the work device; and a mounting platform comprising:

a first interface coupled to the elevating system;

a second interface configured to engage a chassis of the aerial system such that the mounting platform mounts the aerial device to the chassis; and an insulated core comprising an electrically insulating material, wherein the insulated core is between the first interface and the second interface such that the first interface is vertically separated from the second interface by a gap and the elevating system is above the insulated core.

2. The aerial system of claim 1, wherein the insulated core of the mounting platform comprises a dielectric material.

3. The aerial system of claim 1, wherein the elevating system is movable relative to the mounting platform.

4. The aerial system of claim 1, wherein the insulated core of the mounting platform comprises a non-metallic material.

5. The aerial system of claim 1, further comprising the chassis, wherein the chassis is a ground-engaging chassis, and wherein the mounting platform is fixed on the chassis using the second interface.

6. The aerial system of claim 1, wherein the elevating system comprises a boom, wherein the boom is at least vertically movable between a lowered position and an elevated position, and wherein a vertical height of the mounting platform is fixed.

7. The aerial system of claim 1, wherein the elevating system comprises a base coupled to the mounting platform, wherein a transverse dimension of the mounting platform is greater than a transverse dimension of the base of the elevating system.

8. An aerial system comprising:

a ground-engaging chassis configured to support an aerial device comprising a work device and an elevating system; and a mounting platform comprising opposing ends arranged in a vertical direction, a first end of the opposing ends on the chassis, a second end of the opposing ends comprising an interface configured to engage the elevating system of the aerial device, wherein the opposing ends of the mounting platform are electrically isolated.

9. The aerial system of claim 8, wherein the mounting platform comprises a dielectric material.

10. The aerial system of claim 8, wherein the ground-engaging chassis comprises a vehicle chassis.

11. The aerial system of claim 10, further comprising the aerial device, wherein the aerial device comprises a work device and a boom for positioning the work device relative to the vehicle chassis, and wherein the mounting platform connects the boom to the vehicle chassis.

12. The aerial system of claim 8, a vertical height of the mounting platform is fixed.

13. The aerial system of claim 8, further comprising the aerial device, wherein the aerial device comprises a work device and an elevating system, wherein the mounting platform is fixed relative to the chassis, wherein the mounting platform connects the elevating system to the chassis, and wherein the elevating system is movable relative to the mounting platform.

14. The aerial system of claim 8, further comprising the aerial device, wherein the aerial device comprises a work device and an elevating system, wherein the elevating system comprises a base coupled to the mounting platform, and wherein a transverse dimension of the mounting platform is greater than a transverse dimension of the base of the elevating system.

15. An aerial system comprising:

an aerial device comprising a work device and an elevating system configured to raise and lower the work device; and a mounting platform comprising opposing ends arranged in a vertical direction, wherein a first end of the opposing ends is coupled to the elevating system and a second end of the opposing ends is configured to engage a ground-engaging chassis, wherein the mounting platform is an electrical insulator and the opposing ends of the mounting platform are electrically isolated.

16. The aerial system of claim 15, wherein the mounting platform comprises a dielectric material.

17. The aerial system of claim 15, wherein the mounting platform comprises a non-metal material.

18. The aerial system of claim 15, further comprising the ground-engaging chassis and the aerial device, wherein the aerial device is at least vertically movable relative to the ground-engaging chassis and relative to the mounting platform.

19. The aerial system of claim 15, wherein the mounting platform comprises a glass-based material, a porcelain-based material, or a composite polymer material.

20. The aerial system of claim 15, wherein the elevating system comprises a base coupled to the mounting platform, wherein a transverse dimension of the mounting platform is greater than a transverse dimension of the base of the elevating system.

* * * * *